(12) United States Patent
Taneichi

(10) Patent No.: US 9,239,073 B2
(45) Date of Patent: Jan. 19, 2016

(54) FASTENING DEVICE

(71) Applicant: Kaoru Taneichi, Kanagawa (JP)

(72) Inventor: Kaoru Taneichi, Kanagawa (JP)

( * ) Notice: Subject to any disclaimer, the term of this patent is extended or adjusted under 35 U.S.C. 154(b) by 51 days.

(21) Appl. No.: 14/169,722

(22) Filed: Jan. 31, 2014

(65) Prior Publication Data

US 2015/0219144 A1    Aug. 6, 2015

(51) Int. Cl.
*F16B 39/36* (2006.01)
*F16B 39/282* (2006.01)

(52) U.S. Cl.
CPC .................................. *F16B 39/282* (2013.01)

(58) Field of Classification Search
CPC .... F16B 39/282; F16B 25/0057; F16B 37/08; F16B 37/10
USPC .................................. 411/267, 388, 389, 433
See application file for complete search history.

(56) References Cited

U.S. PATENT DOCUMENTS

| | | | | |
|---|---|---|---|---|
| 3,058,386 | A * | 10/1962 | Morrow | 411/511 |
| 4,729,707 | A * | 3/1988 | Takahashi | 411/389 |
| 4,850,777 | A * | 7/1989 | Lawrence et al. | 411/433 |
| 4,974,888 | A * | 12/1990 | Childers | 292/251 |
| 5,340,252 | A * | 8/1994 | Weddendorf | 411/267 |
| 5,468,105 | A * | 11/1995 | Iwamoto | 411/433 |
| 6,007,284 | A * | 12/1999 | Taneichi | 411/267 |
| 6,406,239 | B1 * | 6/2002 | Mauri | 411/383 |
| 6,712,574 | B1 * | 3/2004 | Roopnarine | 411/433 |
| 7,434,364 | B2 * | 10/2008 | MacDermott et al. | 52/584.1 |
| 7,744,322 | B2 * | 6/2010 | Taneichi | 411/433 |
| 8,070,404 | B1 * | 12/2011 | Schluter | 411/368 |
| 2009/0060664 | A1 * | 3/2009 | Bean | 407/102 |

FOREIGN PATENT DOCUMENTS

| | | |
|---|---|---|
| JP | 2534717 | 2/1997 |
| JP | 2006-348543 | 12/2006 |

* cited by examiner

*Primary Examiner* — Gary Estremsky
(74) *Attorney, Agent, or Firm* — Jordan and Hamburg LLP

(57) ABSTRACT

The present invention provides a fastening device that allows an attachment operation to be simply and easily performed even by a single person, is capable of fastening and fixing with certainty, and is capable of reducing cost. A fastening device is configured by: a bolt in which a right screw is formed on one end portion and a left screw is formed on another end portion; a jig engaging section that is formed on one end portion or both end portions of the bolt such as to be capable of being rotated using a jig that rotates the bolt; and a right screw nut and a left screw nut that respectively screw onto the right screw in the one end portion of the bolt and the left screw in the other end portion.

5 Claims, 30 Drawing Sheets

FASTENING DEVICE

BACKGROUND OF THE INVENTION

1. Field of the Invention

The present invention relates to a fastening device that can be used to fasten and fix together a column and a beam, a metal piece attached to a column and a beam, wood materials, and the like.

2. Description of the Related Art

Conventionally, when a column and a beam, a metal piece attached to a column and a beam, or wood materials are fastened and fixed together, a bolt insertion hole is formed in the column, the beam, the metal piece attached to a column, or the wood materials. A bolt then is inserted into the bolt insertion hole, and fastened and fixed by a nut.

In fastening and fixing using a bolt and a nut such as this, operations for stopping a head portion of the bolt from turning and for rotating the nut are required to be performed. There is a disadvantage in that these operations are difficult for a person to perform alone and are time consuming.

[Parent Literature 1] Utility Model Publication No. 2534717

[Patent Literature 2] Japanese Patent Application Laid-open Publication No. 2006-348543

SUMMARY OF THE INVENTION

The present invention has been achieved in light of such disadvantages of the past. An object of the present invention is to provide a fastening device that allows an attachment operation to be simply and easily performed even by a single person, is capable of fastening and fixing with certainty, and is capable of reducing cost.

The description above, other objects, and novel features of the present invention will become more completely clear when the following description is read with reference to the accompanying drawings.

However, the drawings are mainly for description and do not limit the technical scope of the present invention.

To achieve the above-described object, a fastening device of the present invention is configured by: a bolt in which a right screw is formed on one end portion and a left screw is formed on another end portion; a jig engaging section that is formed on one end portion or both end portions of the bolt such as to be capable of being rotated using a jig that rotates the bolt; and a right screw nut and a left screw nut that respectively screw onto the right screw in the one end portion of the bolt and the left screw in the other end portion.

EFFECTS OF THE INVENTION

As is clear from the description above, the present invention achieves the following effects:

(1) According to a first aspect, the right nut and the left nut screwed onto both end portions of the bolt can be moved in a fastening or loosening direction by the jig being engaged with the jig engaging sections formed in the bolt and rotated.

Therefore, a fastening operation can be simply and easily performed even by a single person, by merely placing the right nut and the left nut screwed onto both end portions of the bolt being placed in contact with the fastening members, and the bolt being rotated.

(2) As a result of above-described (1), the jig engaging section is merely required to be formed in the end portions of the bolt in which the right screw and the left screw are formed, the jig engaging section capable of being rotated using the jig. The structure is simple and can be easily manufactured.

(3) As a result of above-described (1), the fastening members are fastened at both end portions by the right screw nut and the left screw nut. Therefore, compared to a conventional technique of fastening and fixing from one direction using a bolt and a nut, fastening and fixing can be performed from both directions and in an even manner. In addition, compared to the number of times a nut is turned in the conventional technique using a bolt and a nut, the same fastening operation can be performed with substantially half the number of turns.

(4) According to a second aspect, effects similar to above-described (1) to (3) can be achieved. In addition, the right screw nut and the left screw nut can be easily inserted to the fastening positions. The fastening and fixing operation can be efficiently performed in a short amount of time.

(5) According to a third aspect, effects similar to above-described (1) to (3) can be achieved. In addition, the bolt can be inserted into a bolt insertion hole by the end portion of the bolt being struck with a hammer. A setting operation of one bolt can be efficiently performed.

(6) According to a fourth aspect, effects similar to above-described (1) to (3) can be achieved. The right screw nut and the left screw nut can be locked onto the fastening and fixing members by the tabs. Spinning of the right screw nut and the left screw nut can be prevented with certainty even when the bolt is rotated. The fastening and fixing operation can be performed with certainty.

Figure 1:
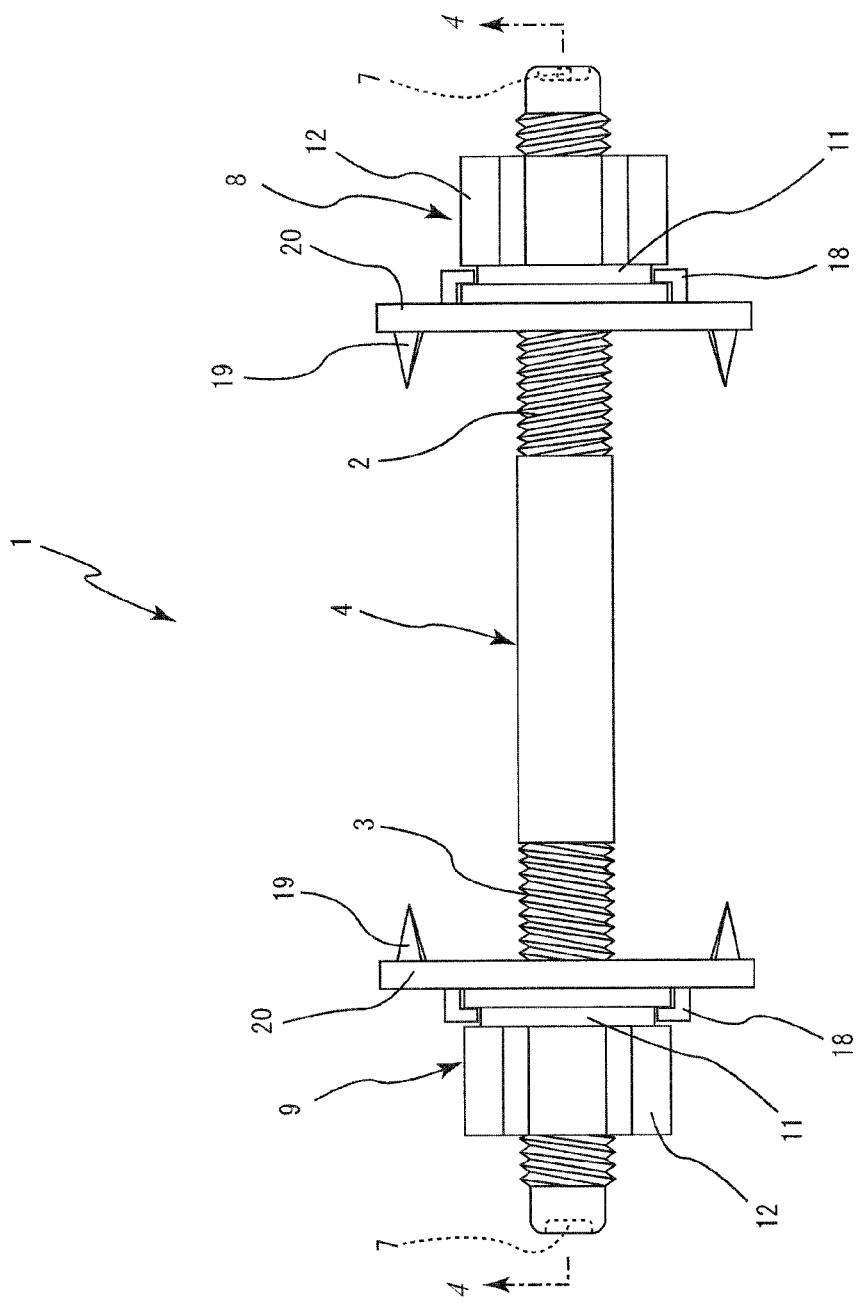
FIG. 1 is a front view of a first embodiment of the present invention.
Figure 2:
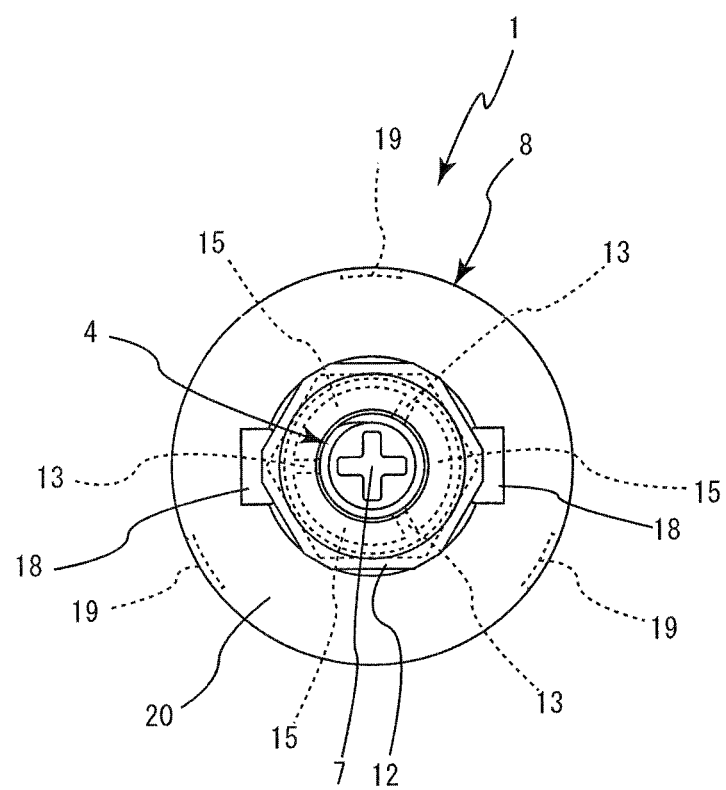
FIG. 2 is a right-side view of the first embodiment of the present invention.
Figure 3:
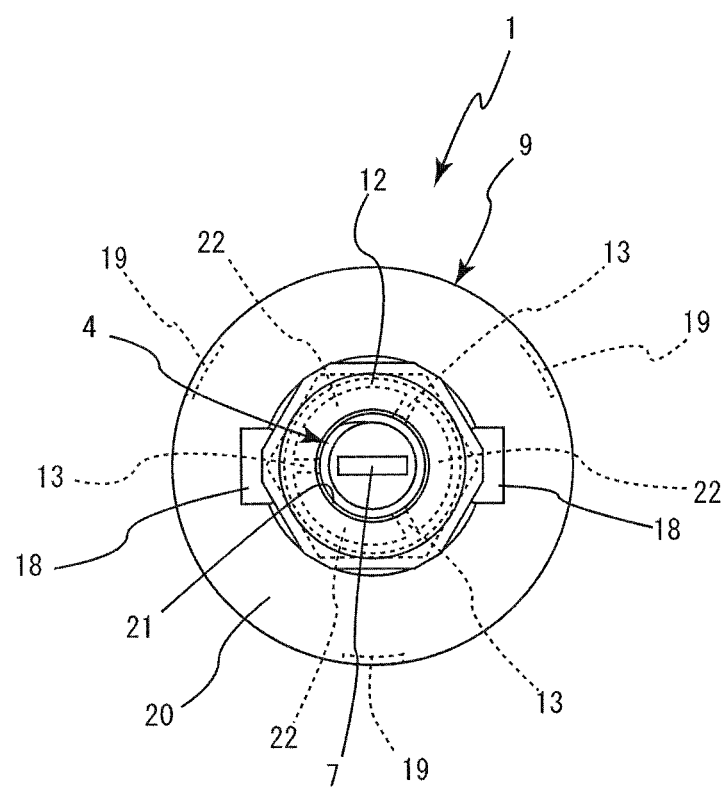
FIG. 3 is a left-side view of the first embodiment of the present invention.
Figure 4:
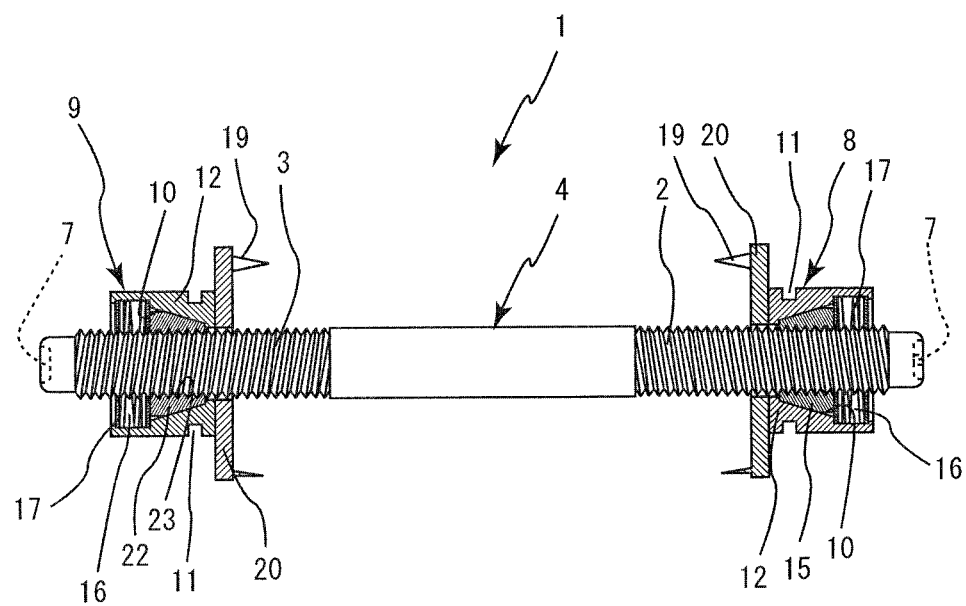
FIG. 4 is a cross-sectional view taken along line 4-4 in FIG. 1.
Figure 5:
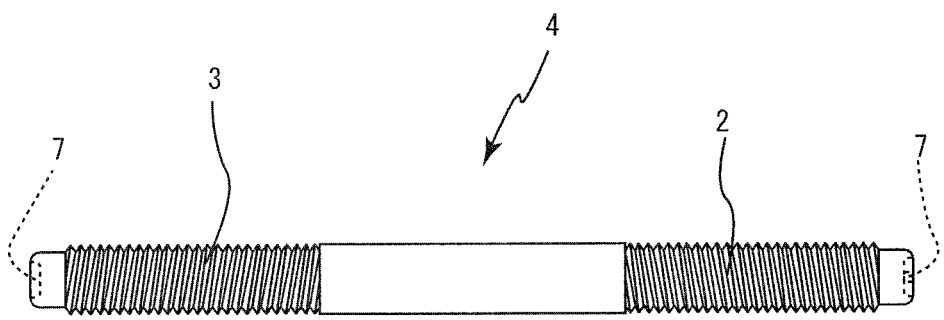
FIG. 5 is an explanatory diagram of a bolt according to the first embodiment of the present invention.
Figure 6:
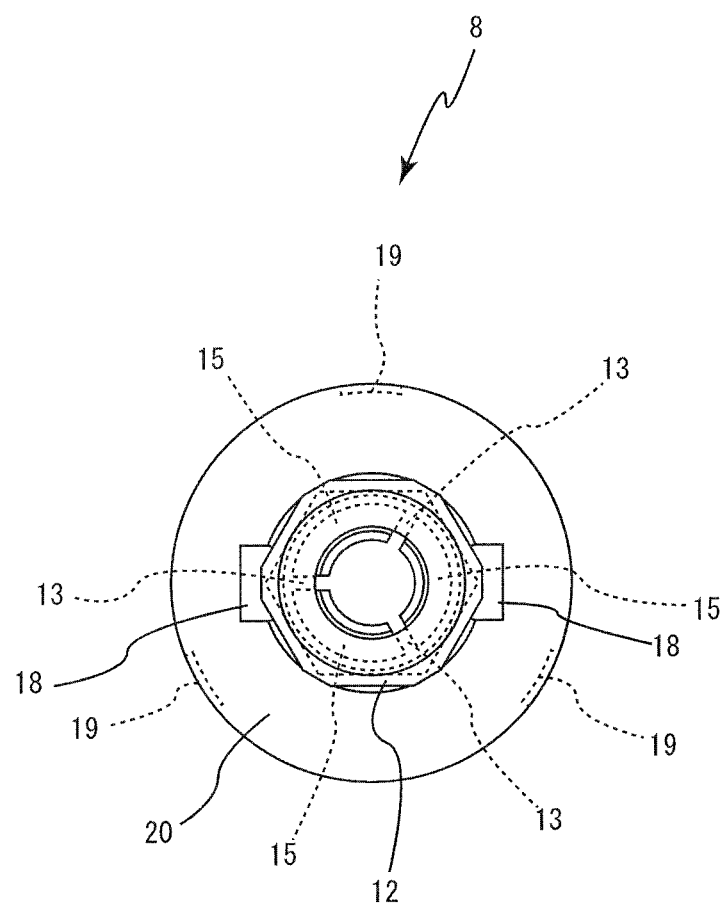
FIG. 6 is a planar view of an easily positioned nut according to the first embodiment of the present invention.
Figure 7:
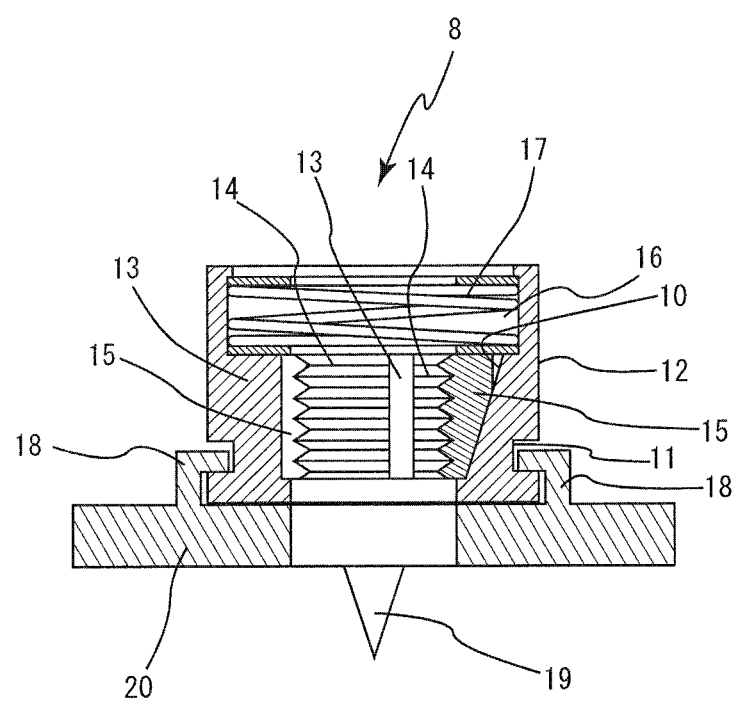
FIG. 7 is a vertical cross-sectional view of the easily positioned nut according to the first embodiment of the present invention.
Figure 8:
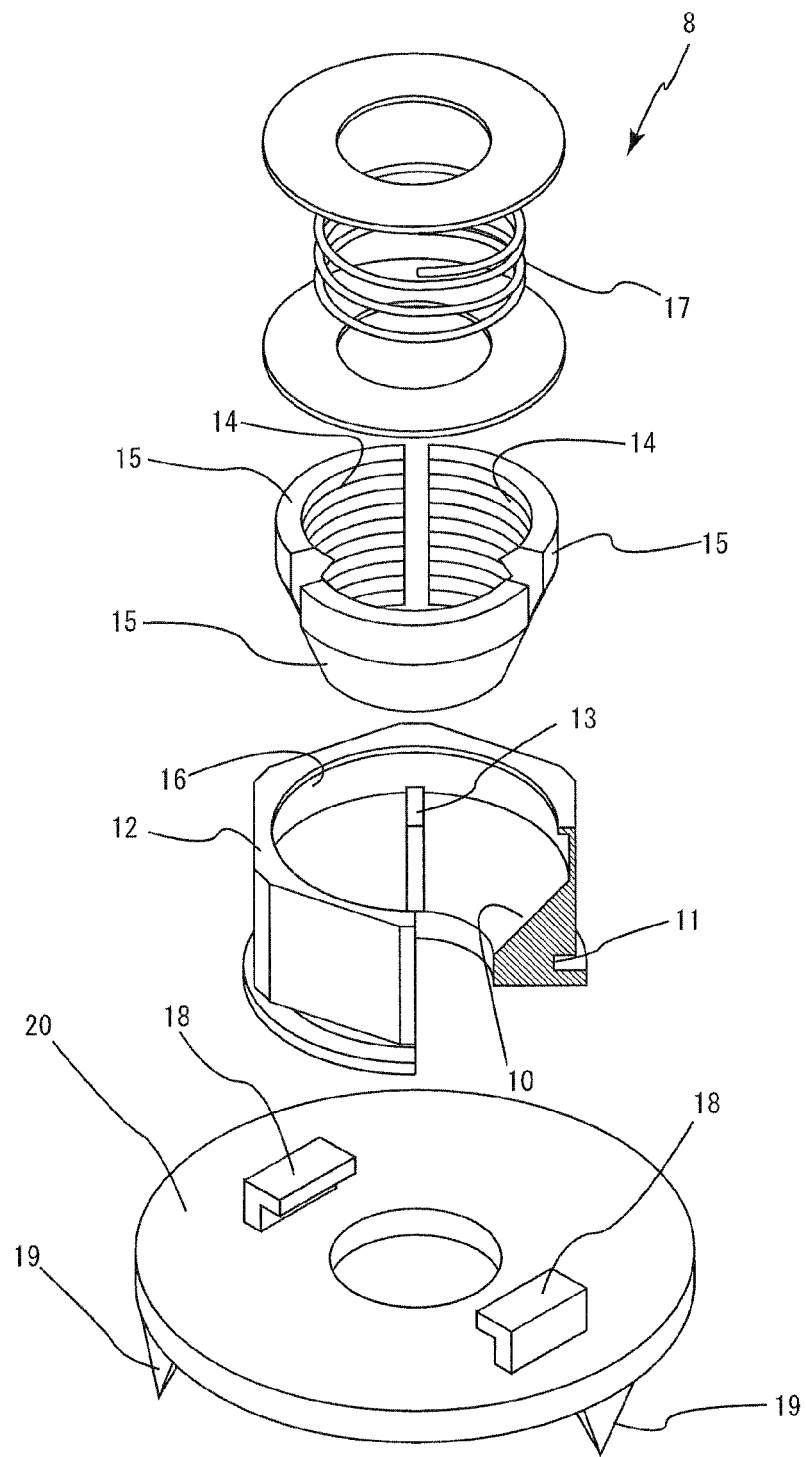
FIG. 8 is an exploded perspective view of the easily positioned nut according to the first embodiment of the present invention.

EXPLANATION OF REFERENCE NUMBERS 1, 1A, 1B, 1C, 1D, and 1E: fastening device
2: right screw
3: left screw
4, 4A, 4B, and 4C: bolt
5 and 5A: rotating jig
6: driver
7 and 7A: jig engaging section
8 and 8A: easily positioned right screw nut
9 and 9A: easily positioned left screw nut
10: slanted hole
11: ring groove for washer attachment
12 and 12A: nut main body
13: guide piece
14: right screw thread
15: right screw nut segment
16: bias spring housing chamber
17: bias spring
18: engaging piece
19: tab
20 and 20A: washer
21: left screw thread
22: left screw not segment
23: joining section
24: column composed of wood material
25: bolt insertion hole
26: connecting metal piece
27: beam
28: recessing section
29: spacer
30: hammer
31: head section
32: engaging hole
33: flange section
34: engaging piece
35: bottom surface
36: head section
37: right screw nut
38: left screw nut

DETAILED DESCRIPTION OF THE PREFERRED EMBODIMENTS

The present invention will be described in detail based on embodiments for carrying out the present invention shown in the drawings.

According to a first embodiment for carrying out the present invention shown in FIG. 1 to FIG. 12, reference number 1 represents a fastening device of the present invention. The fastening device 1 is configured by a bolt 4, a plus or minus jig engaging section 1, an easily positioned right screw nut 8, and an easily positioned left screw nut 9. In the bolt 4, a right screw 2 is formed on one end portion and a left screw 3 is formed on the other end portion. The plus or minus jig engaging section 7 is formed on one end portion of the bolt 4 or on both end portions of the bolt 4. According to the present embodiment, the plus or minus jig engaging sections 7 and 7 are formed on both end portions of the bolt 4. The plus or minus jig engaging sections 7 and 7 allow the bolt 4 to be located by a rotating jig 5, such as a driver, a spanner, or a wrench. According to the present embodiment, the jig 5 is a driver 6. The easily positioned right screw nut 6 can be screwed onto the right screw 2 of the bolt 4 and thrust into a predetermined position of the right screw 2 portion of the bolt 4. The easily positioned left screw nut 9 can be screwed onto the left screw 3 of the bolt 4 and thrust into a predetermined position of the left screw 3 portion of the bolt 4.

The easily positioned right screw nut 8 is configured by a nut main body 12, guide pieces 13, right screw nut segments 15, a bias spring 17, and a washer 20. In the nut main body 12, a slanted hole 10 of which the inner diameter becomes successively smaller is formed on an inner wall surface. An outer wall surface or the nut main body 12 is formed into a polygonal shape. A ring groove 11 for washer attachment is formed in an outer peripheral portion of a small-diameter end portion of the slanted hole 10. At least two guide pieces 13 are formed in an axial center direction or the inner wall surface of the nut main body 12, in the slanted hole 10 portion. According to the present embodiment, three guide pieces 13, 13, and 13 are provided. The right screw nut segments 15, 15, and 15 are attached between the three guide pieces 13, 13, and 13, such as to be slidable in the axial center direction and so as not to detach by the small-diameter slanted hole 10. The right screw nut segments 15, 15, and 15 each have a right screw thread 14 on the inner wall surface thereof that screws with the right screw 2 of the bolt 4. The bias spring 17 is housed within a bias spring housing chamber 16 formed on the top surface of the slanted hole 10, such as to urge the right screw nut segments 15, 15, and 15 towards the small-diameter slanted hole 10 side at all times. The bias spring 17 is held within the bias spring housing chamber 16 by an end portion of the bias spring housing chamber 16 being crimped. In the washer 20, engaging pieces 18 and 18 are formed that engage with the ring groove 11 for washer attachment of the nut main body 12, and at least one tab 19 is formed that wedges into a fastening member composed of a wood material. According to the present embodiment, three tabs 19, 19, and 19 are formed.

The easily positioned left screw nut 9 is configured by a nut main body 12, guide pieces 13, left screw nut segments 22, a bias spring 17, and a washer 20. In the nut main body 12, a slanted hole 10 of which the inner diameter becomes successively smaller is formed on an inner wall surface. An outer wall surface of the nut main body 12 is formed into a polygonal shape. A ring groove 11 for washer attachment is formed in an outer peripheral portion of a small-diameter end portion of the slanted hole 10. At least two guide pieces 13 are formed in an axial center direction on the inner wall surface of the nut main body 12, in the slanted hole 10 portion. According to the present embodiment, three guide pieces 13, 13, and 13 are provided. The left screw nut segments 22, 22, and 22 are attached between the three guide pieces 13, 13, and 13, such as to be slidable in the axial center direction and so as not to detach by the small-diameter slanted hole 10. The left screw nut segments 22, 22, and 22 each have a left screw thread 21 on the inner wall surface thereof that screws with the left screw 3 of the bolt 4. The bias spring 17 is housed within a bias spring housing chamber 16 formed on the top surface of the slanted hole 10, such as to urge the left screw nut segments 22, 22, and 22 towards the small-diameter slanted hole 10 side at all times. The bias spring 17 is held within the bias spring housing chamber 16 by an end portion of the bias spring housing chamber 16 being crimped. In the washer 20, engaging pieces 18 and 18 are formed that engage with the ring groove 11 for washer attachment of the nut main body 12, and at least one tab 19 is formed that wedges into a fastening member composed of a wood material. According to the present embodiment, three tabs 19, 19, and 19 are formed.

Figure 9:
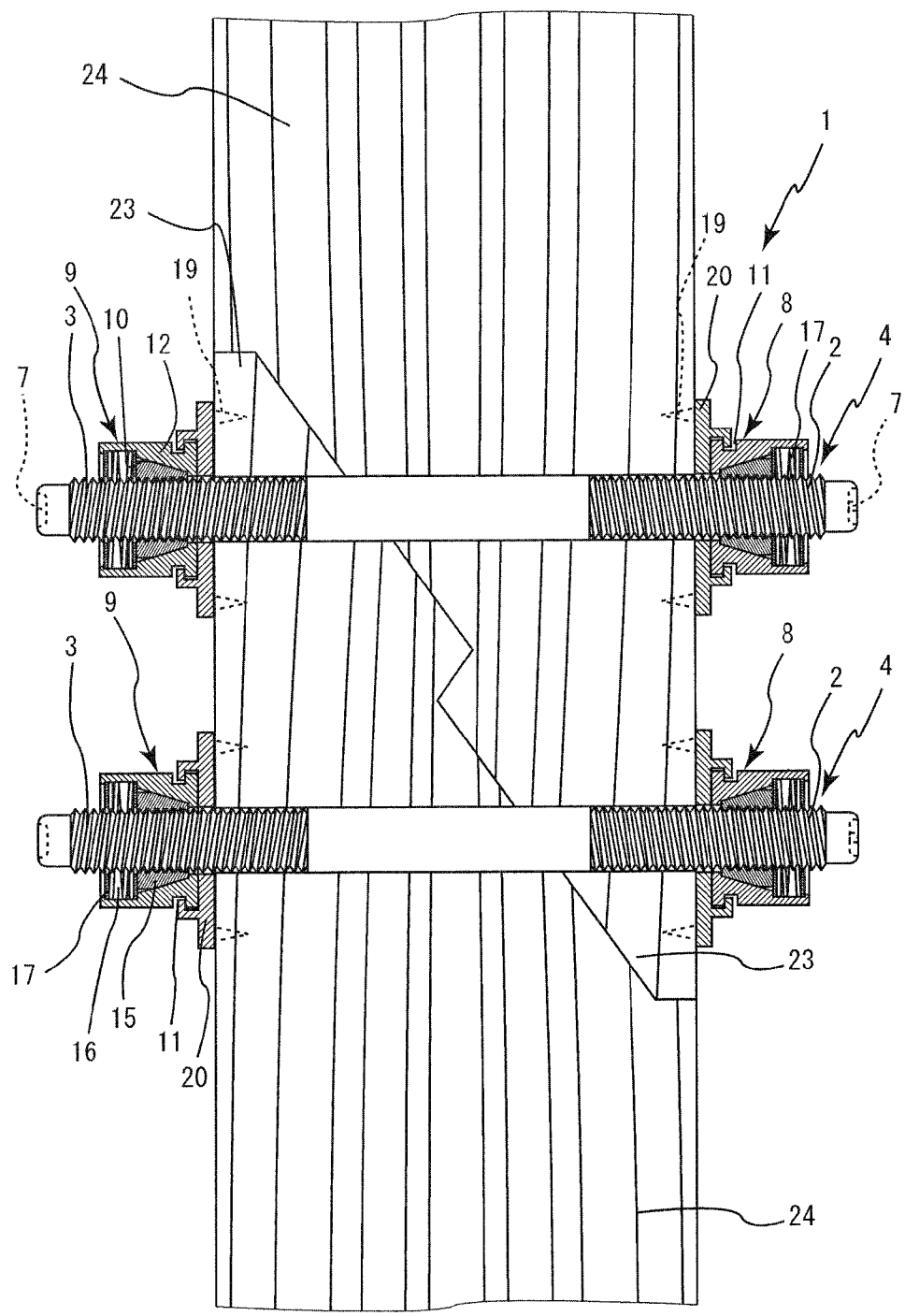
FIG. 9 is an explanatory diagram of a state of use according to the first embodiment of the present invention.
Figure 10:
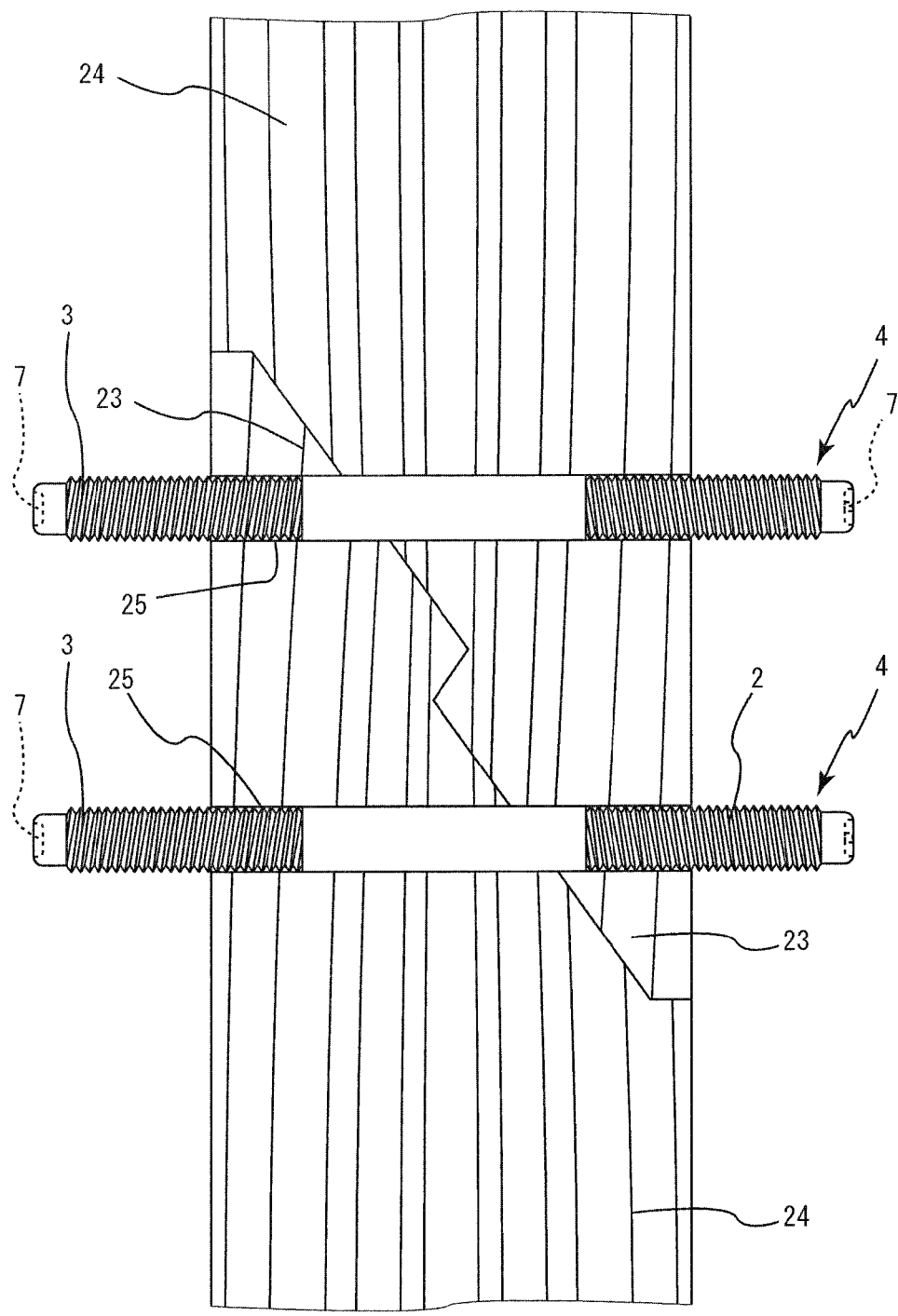
FIG. 10 is an explanatory diagram of a state in which a bolt is inserted according to the first embodiment of the present invention.

The fastening device 1 configured as described above joins columns 24 and 24 composed of wood materials, each in which a joining sect ion 23 is formed in an end portion, at the joining sections 23 and 23, as shown in FIG. 9. A component in which bolt insertion holes 25 and 25 are formed that is capable of joining with the joining sections 23 and 23 is placed, and the bolt 4 is inserted into the bolt insertion holes 25 and 25, as shown in FIG. 10.

Figure 11:
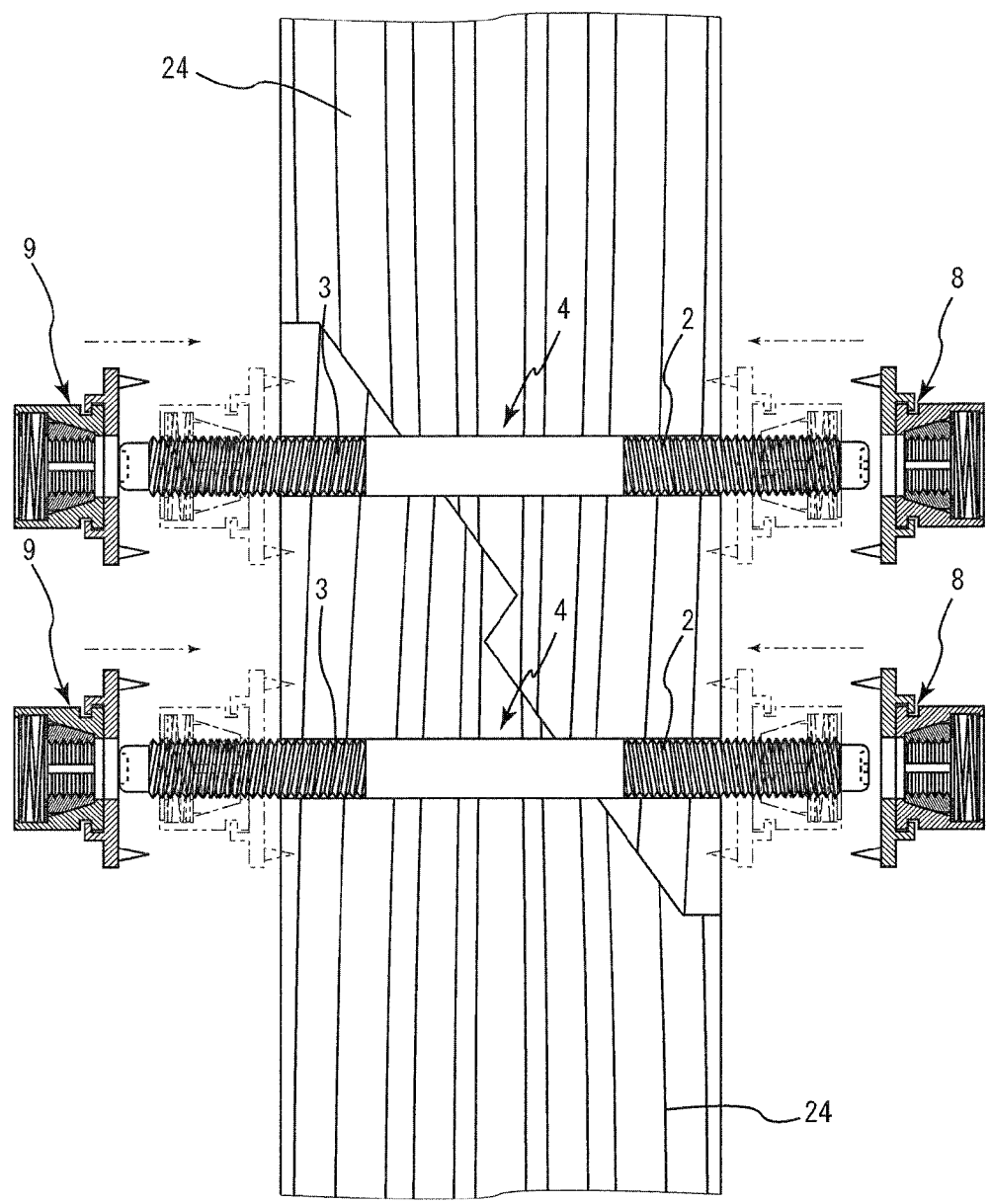
FIG. 11 is an explanatory diagram of a state in which nuts are positioned on both end portions of the bolt according to the first embodiment of the present invention.

Next, as shown in FIG. 11, the easily positioned right screw nut 8 is thrust onto the right screw 2 on one end of she bolt 4, and the tabs 19, 19, and 19 of the washer 20 are wedged into the column 24.

In addition, the easily positioned left screw nut 9 is thrust onto the left screw 3 on the other end portion of the bolt 4, and the tabs 19, 19, and 19 of the washer 20 are wedged into the column 24.

Figure 12:
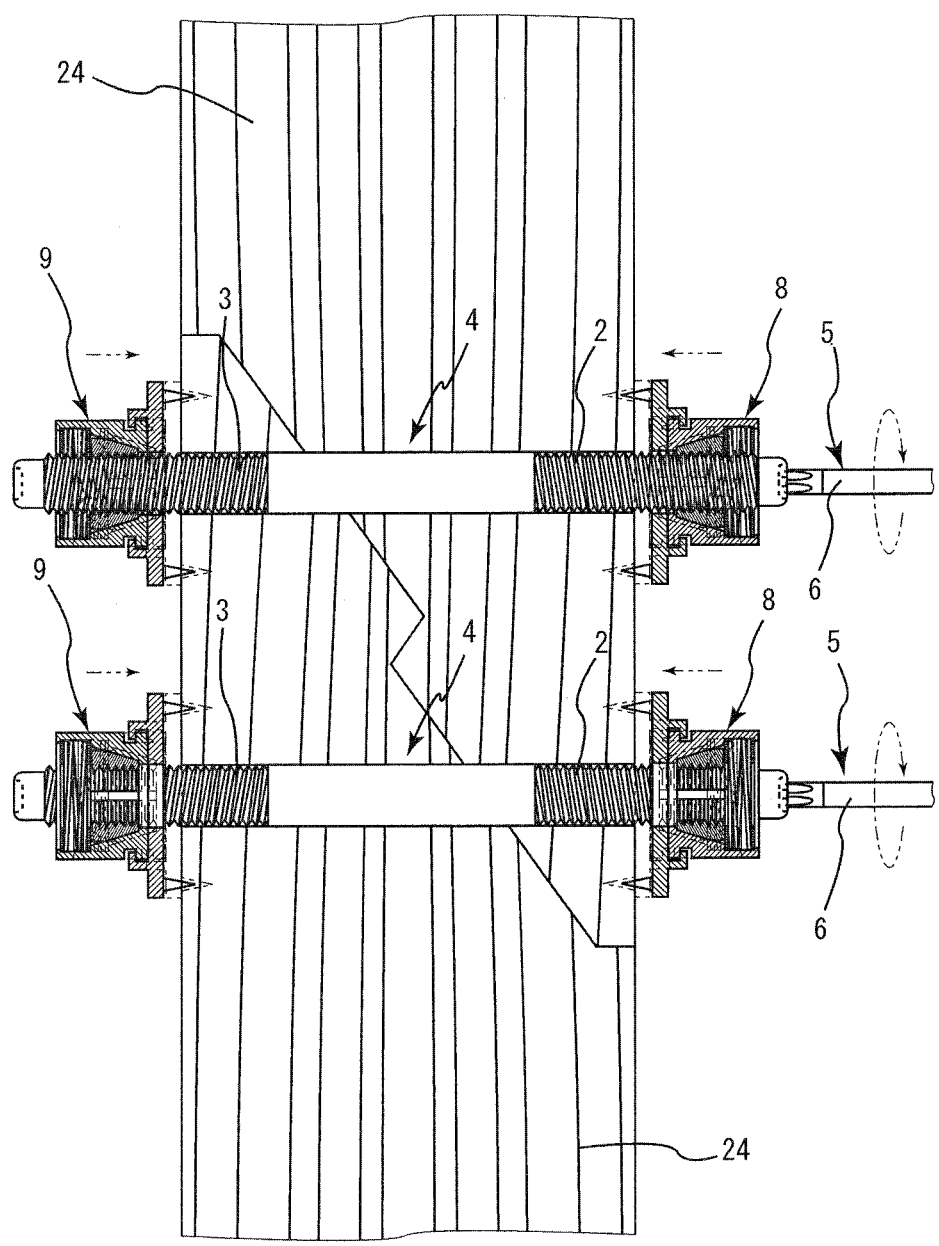
FIG. 12 is an explanatory diagram of a state in which the bolt is rotated, and fastening and fixing is performed according to the first embodiment of the present invention.

Then, the driver 6 is engaged with the plus or minus jig engaging section 7 in one end portion of the bolt 4 and rotated as shown in FIG. 12. As a result, the right screw nut segments 15, 15, and 15 of the easily positioned right screw nut 8 are screwed onto the right screw 2 of the bolt 4. The left screw nut segments 22, 22, and 22 of the easily positioned left screw nut 9 are screwed onto the left screw 3 of the bolt 4. The right screw nut segments 15, 15, and 15 and the left screw nut segments 22, 22, and 22 are moved in the directions of the columns 24 and 24, or in other words, the fastening direction, thereby fastening and fixing together the joining sections 23 and 23 of the columns 24 and 24 and forming a single column.

The right screw 2 of the bolt 4 is in a screwed state with the right nut segments 15, 15, and 15 of the easily positioned right screw 8, and the left screw 3 of the bolt 4 is in a screwed state with the left nut segments 22, 22, and 22 of the easily positioned left screw nut 9 as a result of the rotation of the bolt 4. In addition, contact resistance is generated between the easily positioned right screw nut 8 and the washer 20, and between the easily positioned left screw nut 9 and the washer 20. Therefore, the easily positioned right screw nut 8 and the easily positioned left screw nut 9 can be prevented from rotating together with the bolt 4.

Figure 13:
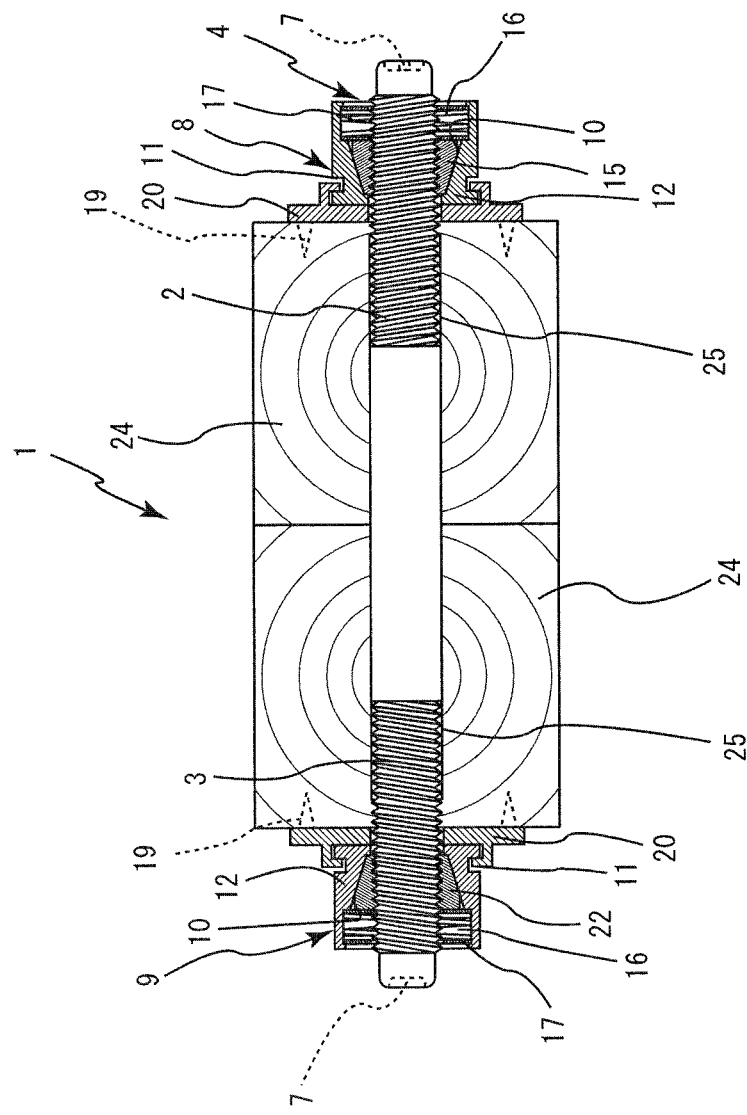
FIG. 13 is an explanatory diagram of another state of use according to the first embodiment of the present invention.
Figure 14:
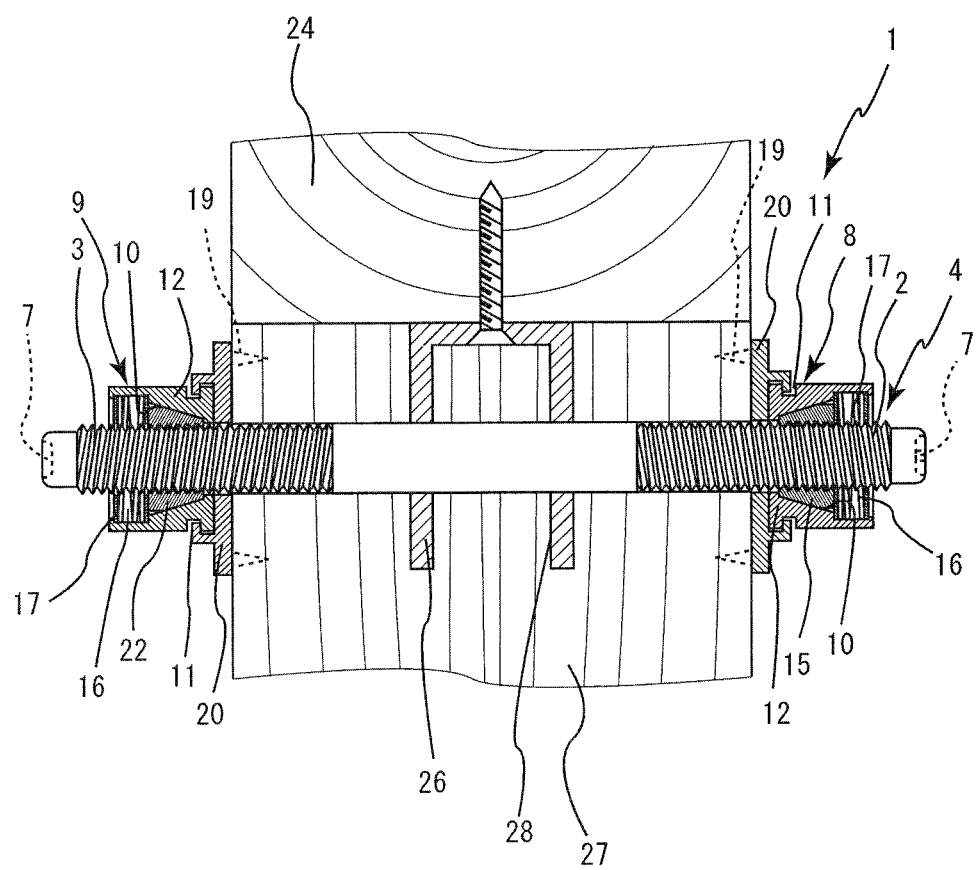
FIG. 14 is an explanatory diagram of another state of use according to the first embodiment of the present invention.
Figure 15:
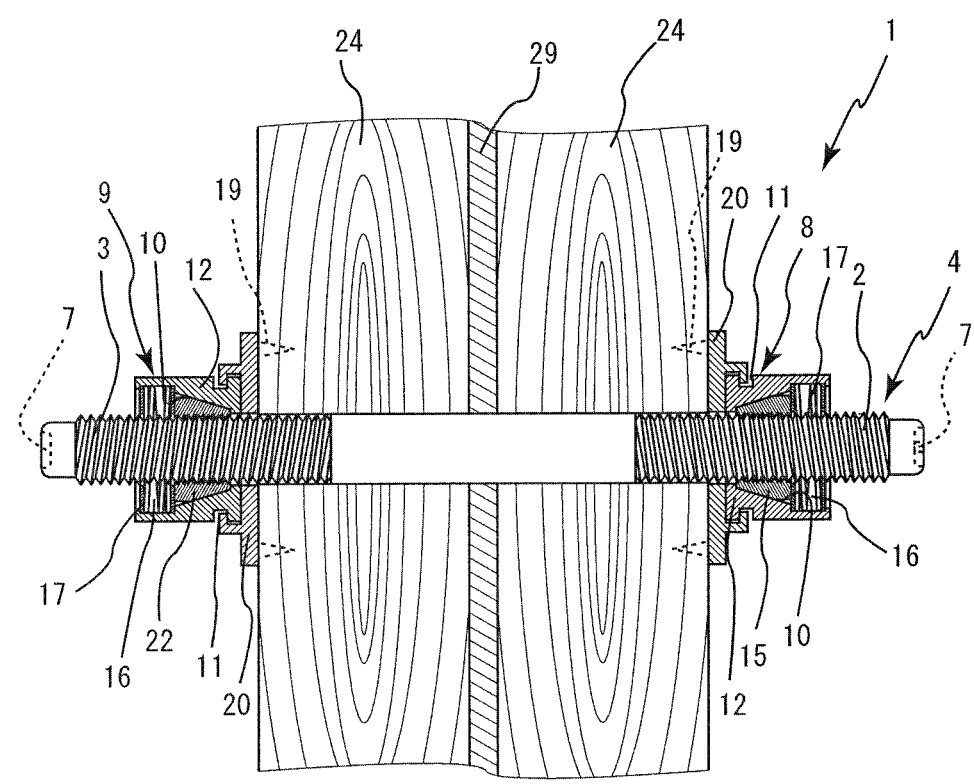
FIG. 15 is an explanatory diagram of another state of use according to the first embodiment of the present invention.

The fastening device 1 of the present invention is used for the fastening and fixing of the column 24 and the column 24, as shown in FIG. 13. In addition, the fastening device 1 is used for the fastening and fixing of a U-shaped connecting metal piece 26 that is fixed to the column 24 and is inserted into a recessing section 28, the recessing section 28 into which the connecting metal piece 26 is inserted being formed in an end portion of a beam 27 connected to the column 24, as shown in FIG. 14. In addition, the fastening device 1 is used for the fastening and fixing of the columns 24 and 24 composed of wood materials with a spacer 29 therebetween, as shown in FIG. 15.

Other Embodiments for Carrying Out the Invention

Next, other embodiments for carrying out the present invention will be described with reference to FIG. 16 to FIG. 30. In the description of the other embodiments for carrying out the present invention, constituent sections that are the same as those according to the first embodiment for carrying out the present invention are given the same reference numbers. Redundant descriptions are omitted.

Figure 16:
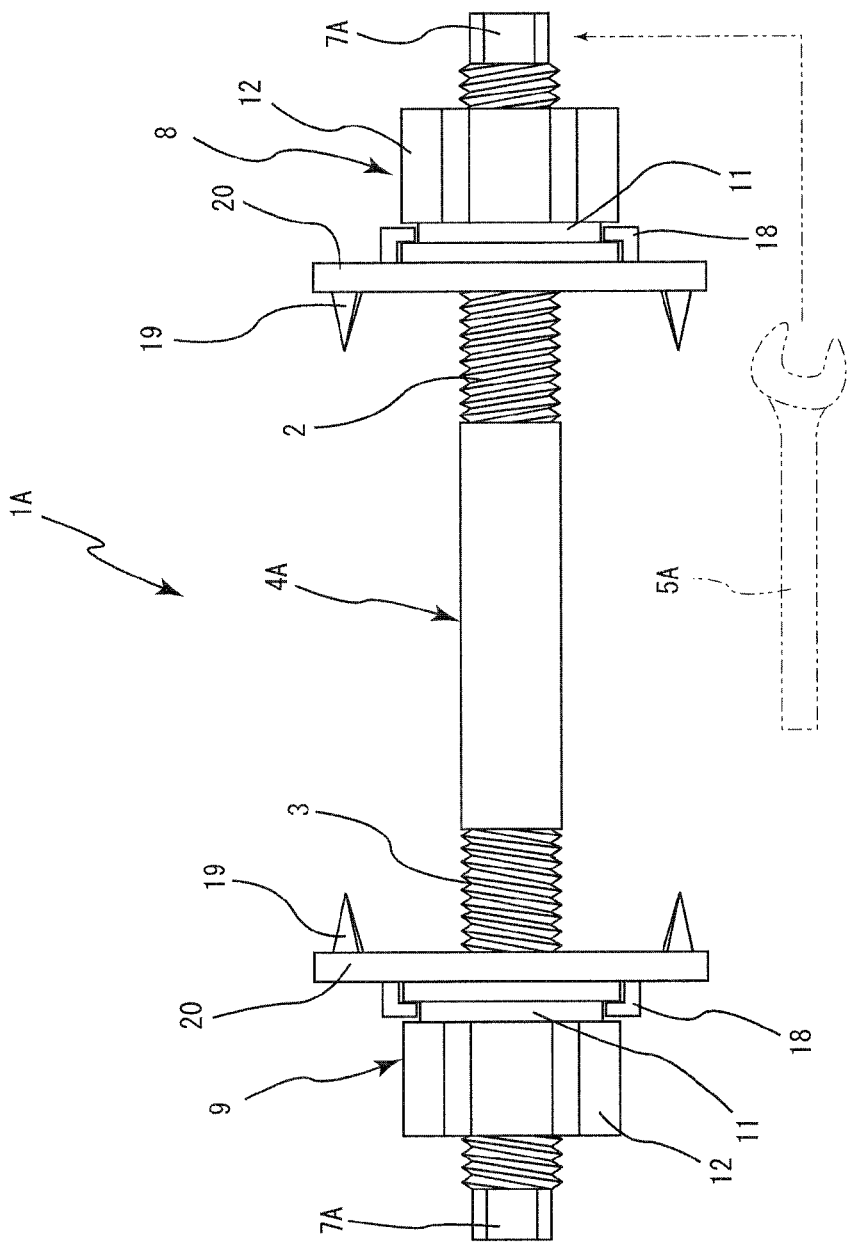
FIG. 16 is a front view of a second embodiment of the present invention.
Figure 17:
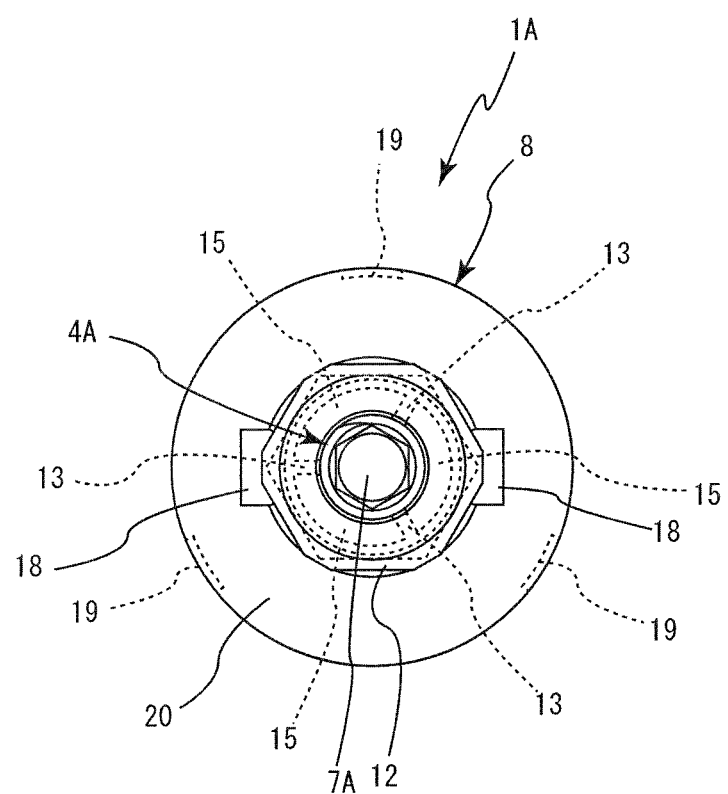
FIG. 17 is a right-side view of the second embodiment of the present invention.
Figure 18:
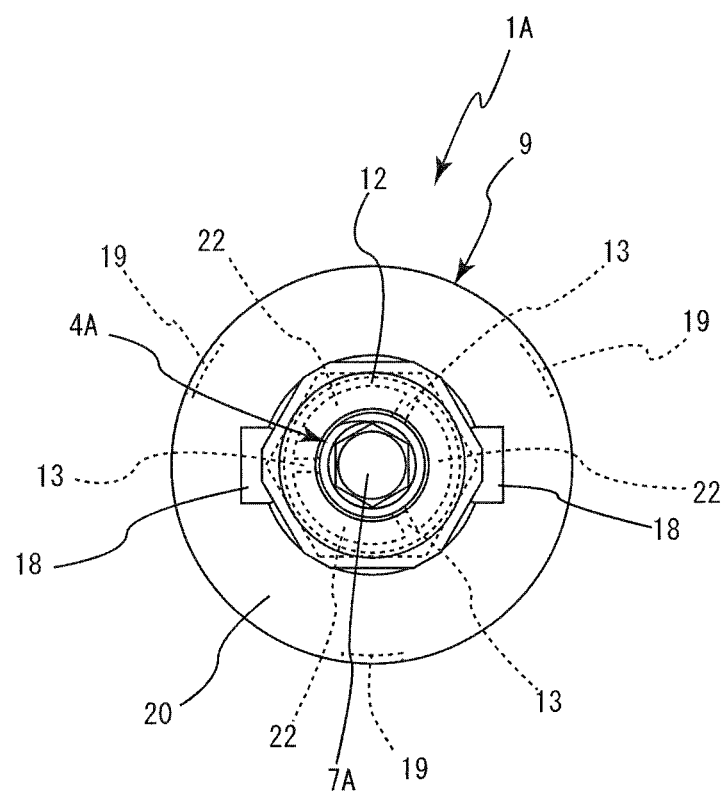
FIG. 18 is a left-side view of the second embodiment of the present invention.

A second embodiment for carrying out the present invention shown in FIG. 16 to FIG. 18 mainly differs from the above-described first embodiment for carrying out the present invention regarding the following point. According to the second embodiment of the present invention, a jig engaging section 7A that engages with a jig 5A that rotates a spanner or a wrench is formed on one end portion or both end portions of a bolt 4A. According to the second embodiment of the present invention, the jig engaging sections 7A and 7A are formed on both end portions of the bolt 4A. A fastening device 1A that is configured rising the bolt 4A in which such jig engaging sections 7A and 7A are formed can achieve working effects similar to those according to the first embodiment for carrying out the present invention.

Figure 19:
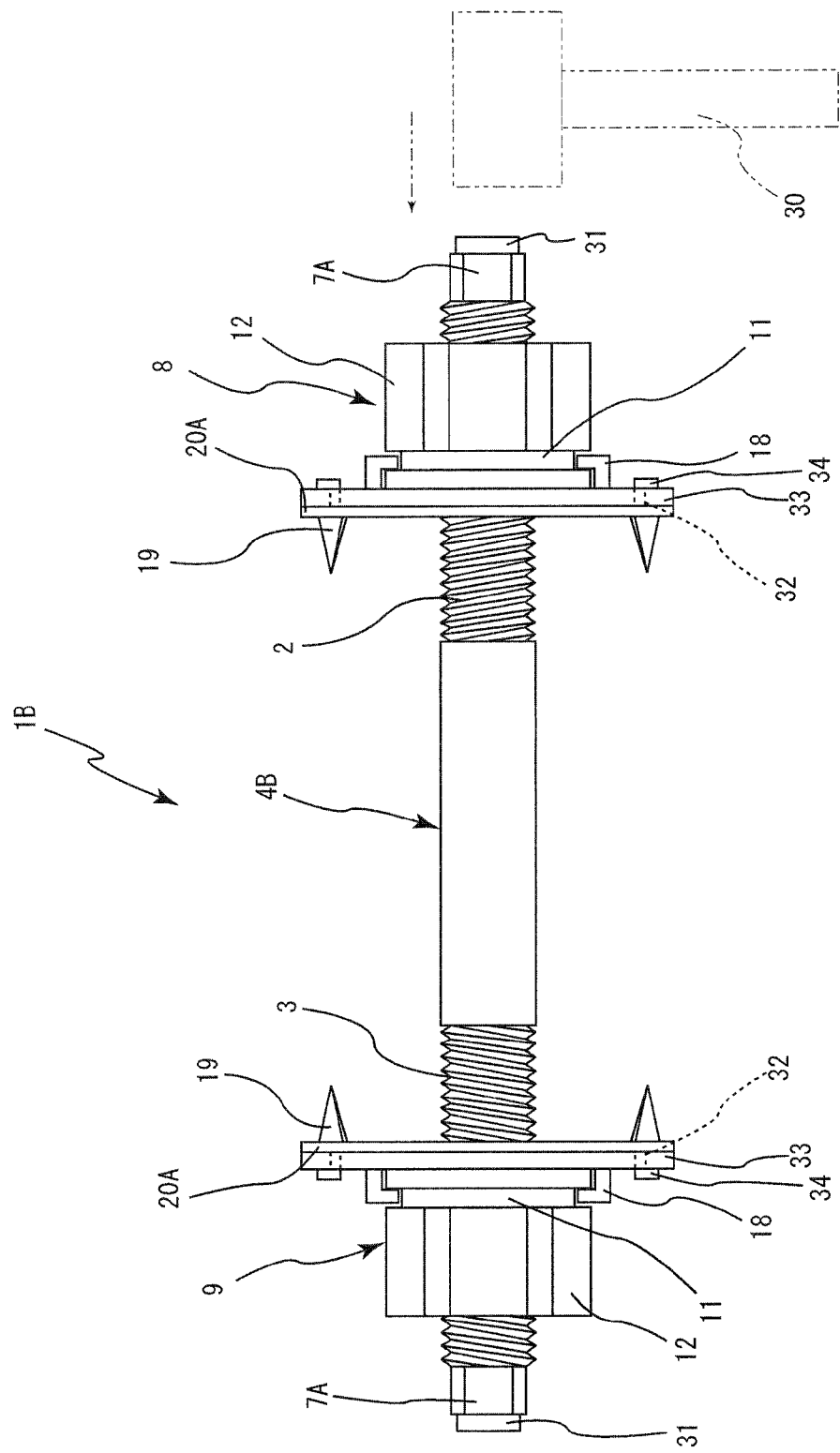
FIG. 19 is a front view of a third embodiment of the present invention.
Figure 20:
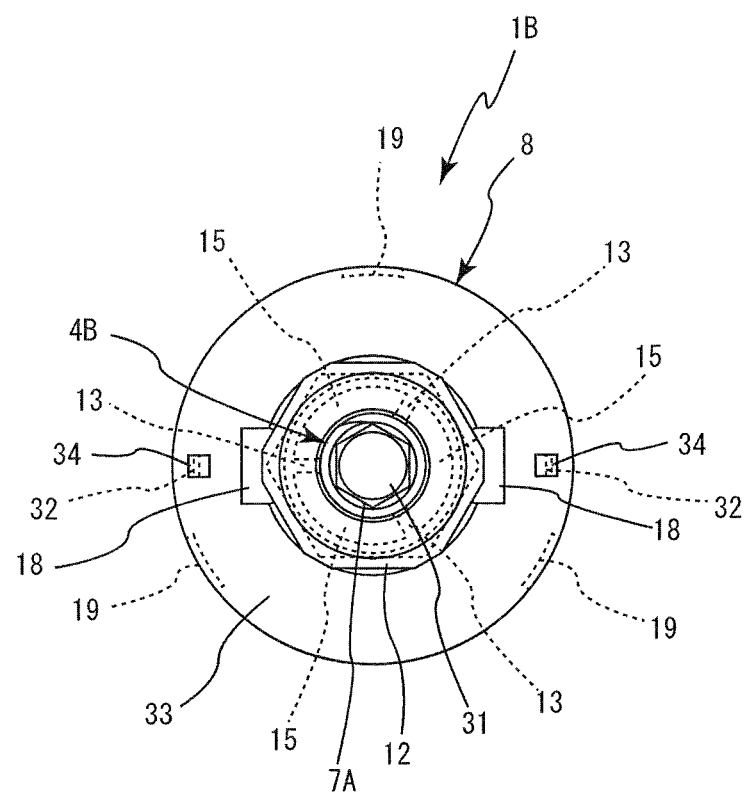
FIG. 20 is a right-side view of the third embodiment of the present invention.
Figure 21:
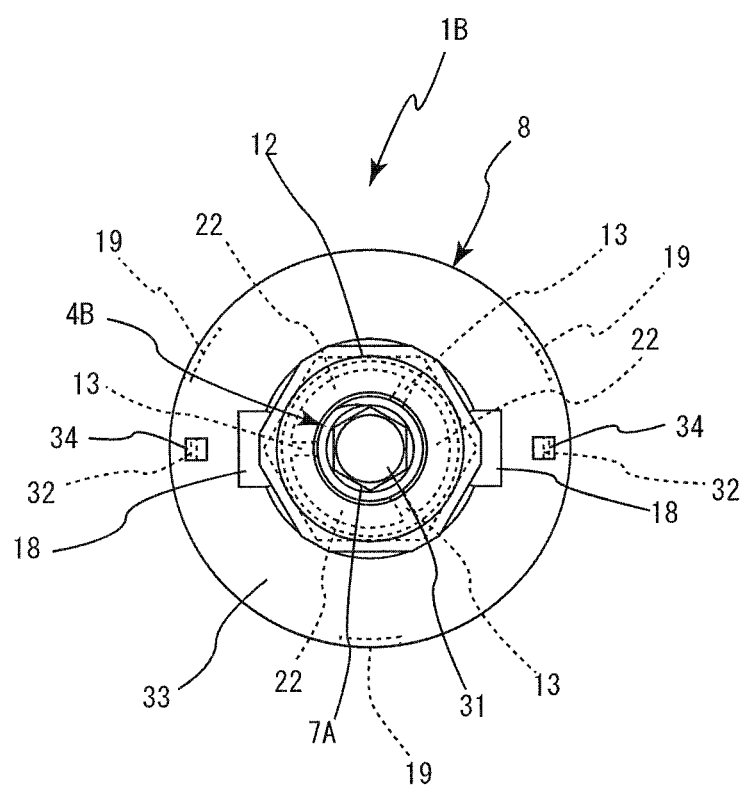
FIG. 21 is a left-side view of the third embodiment of the present invention.

A third embodiment for carrying out the present invention shown in FIG. 19 to FIG. 21 mainly differs from the second embodiment for carrying out the present invention regarding the following point. According to the third embodiment of the present invention, a head section 31 is formed on one end portion or both end portions of a bolt 4B. According to the third embodiment, the head sections 31 and 31 are formed on both end portions of the bolt 4B. The right screw nut 8 and the left screw nut 9 can be inserted into the head sections 31 and 31, and screw threads and the jig engaging sections 7A and 7A can be protected even when struck with a hammer 30. In addition, according to the third embodiment of the present invention, the easily positioned right screw nut 8 and the easily positioned left screw nut 9 are used, each in which a flange section 33 having engaging holes 32 and 32 are formed in the nut main body 12, and a washer 20A is used that has the tabs 19, 19, and 19 in which engaging pieces 34 and 34 are formed that engages with the engaging holes 32 and 32 of the flange section 33. A fastening device 1B that is configured using such a bolt 4B, easily positioned right screw nut 8, and easily positioned left screw nut 9 can achieve working effects similar to those according to the second embodiment for carrying out the present invention.

Figure 22:
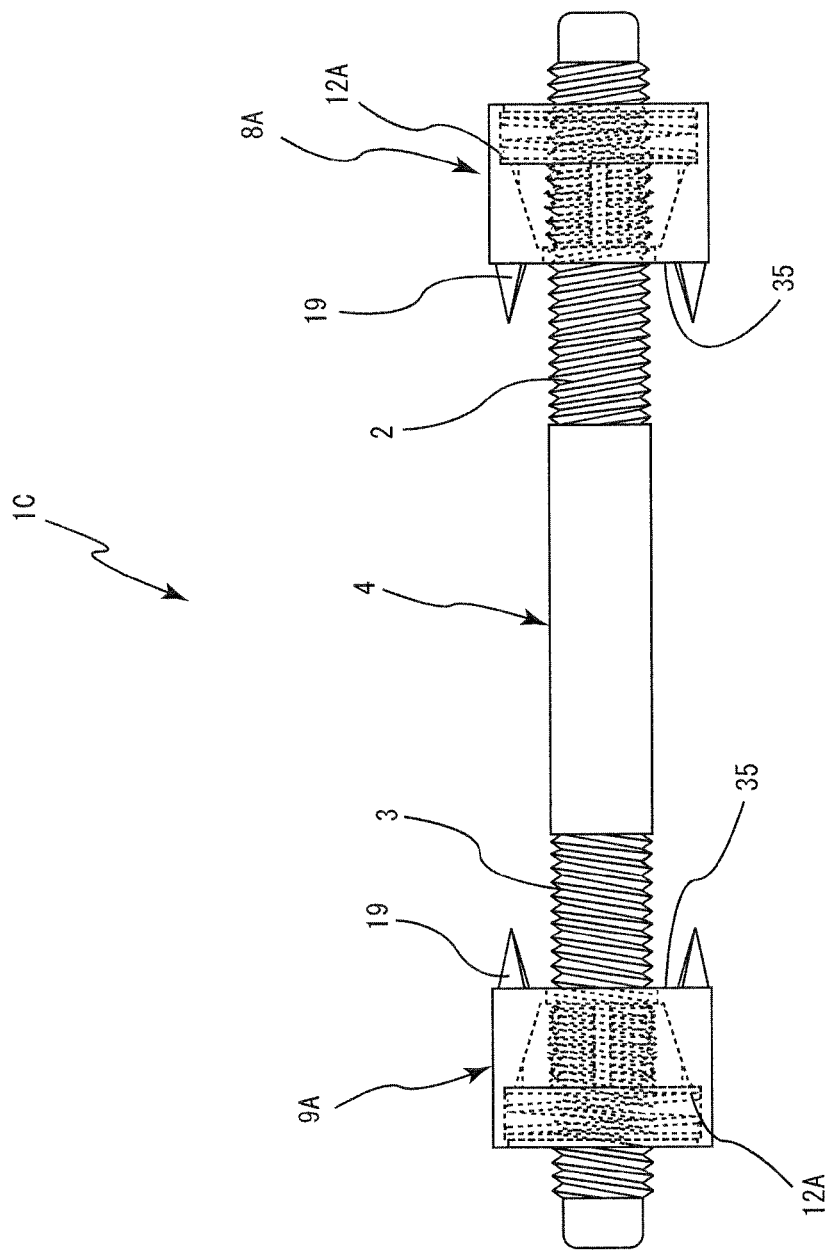
FIG. 22 is a front view of a fourth embodiment of the present invention.
Figure 23:
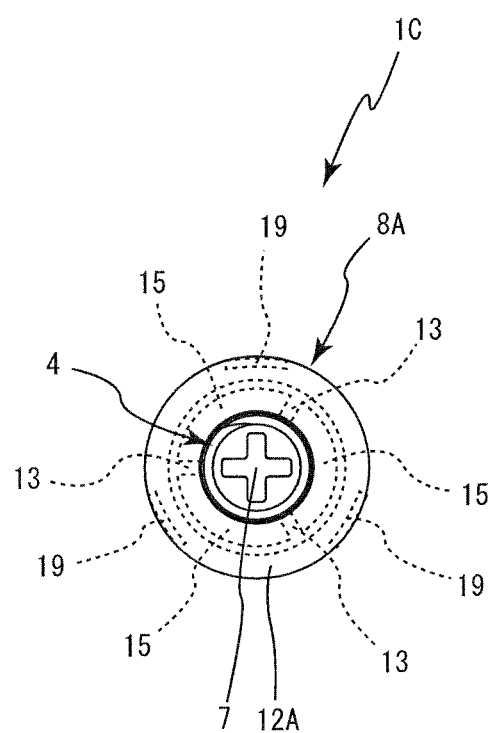
FIG. 23 is a right-side view of the fourth embodiment of the present invention.
Figure 24:
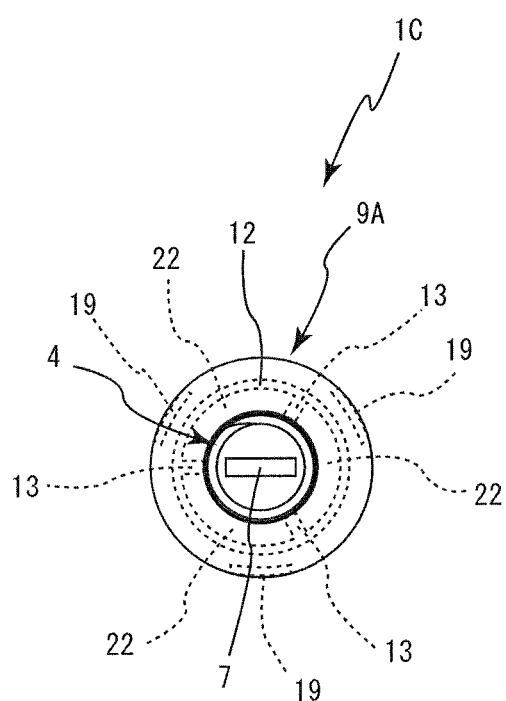
FIG. 24 is a left-side view of the fourth embodiment of the present invention.

A fourth embodiment for carrying out the present invention shown in FIG. 22 to FIG. 24 mainly differs from the first embodiment for carrying out the present invention regarding the following point. According to the fourth embodiment of the present invention, an easily positioned right screw nut 8A and an easily positioned left screw nut 9A are used that each uses a circular cylindrical nut main body 12A in which a plurality of tabs 19, 19, and 19 are formed on a bottom surface 35. A fastening device 1C that is configured using such easily positioned right screw nut 8A and easily positioned left screw nut 9A can achieve working effects similar to those according to the first embodiment for carrying out the present invention.

Figure 25:
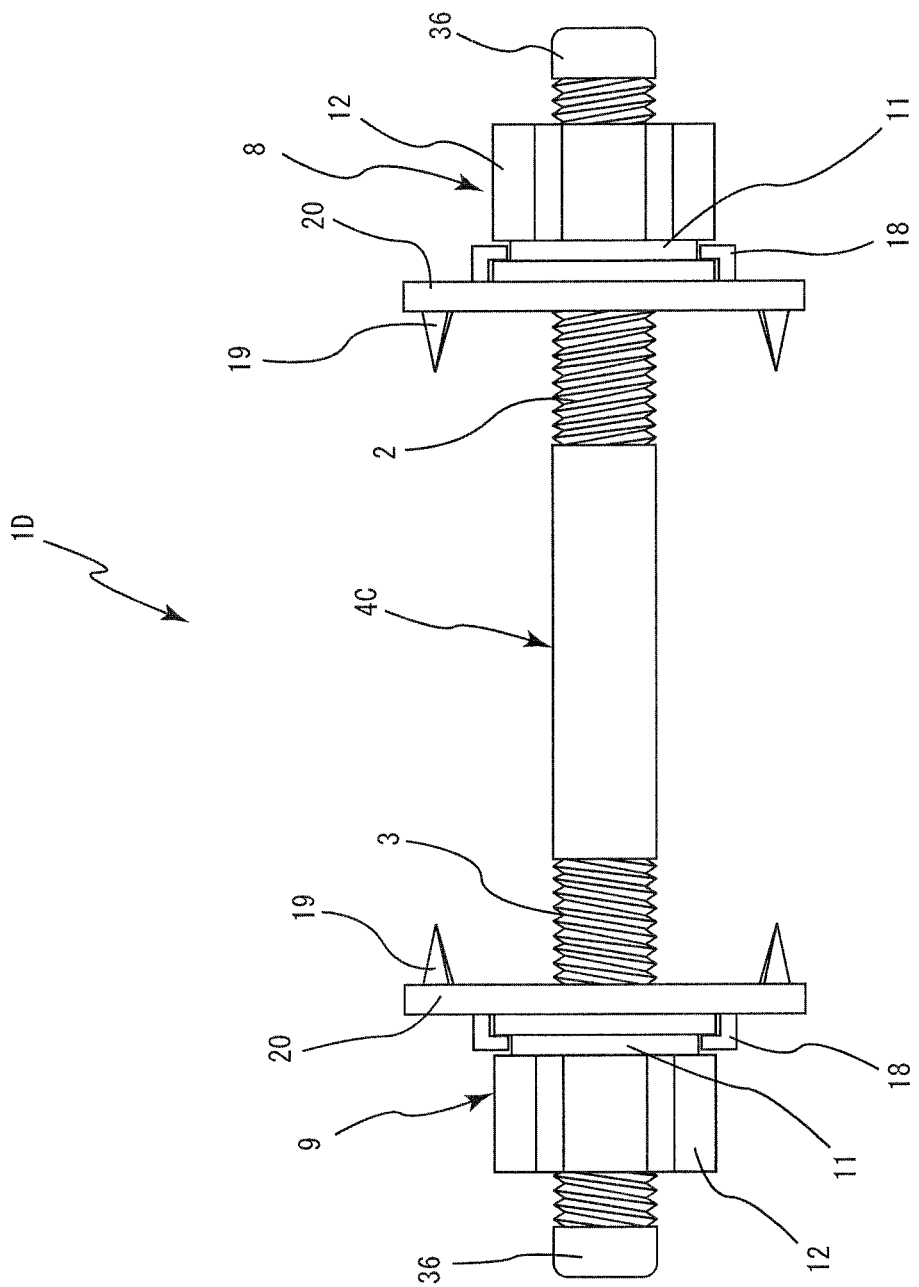
FIG. 25 is a front view of a fifth embodiment of the present invention.
Figure 26:
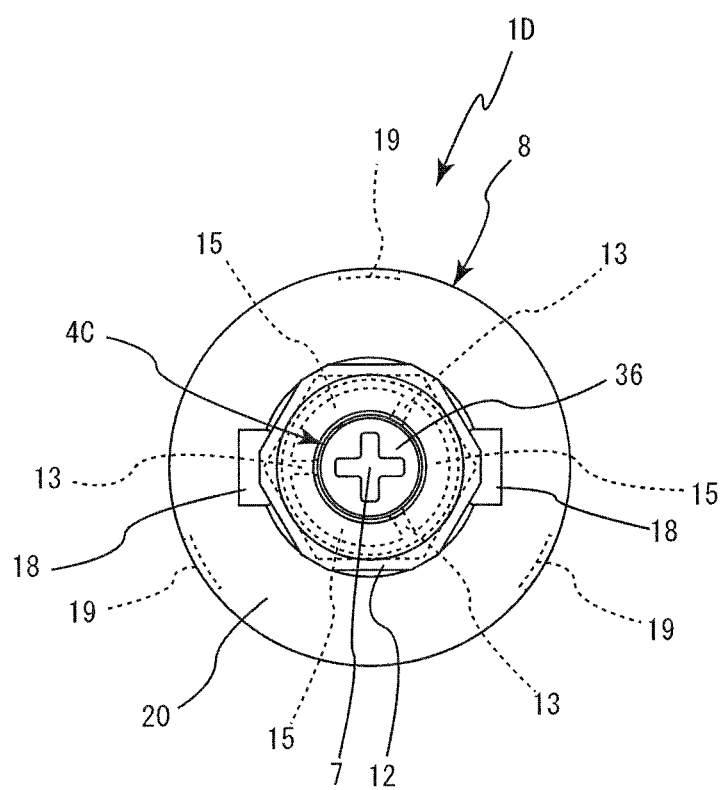
FIG. 26 is a right-side view of the fifth embodiment of the present invention.
Figure 27:
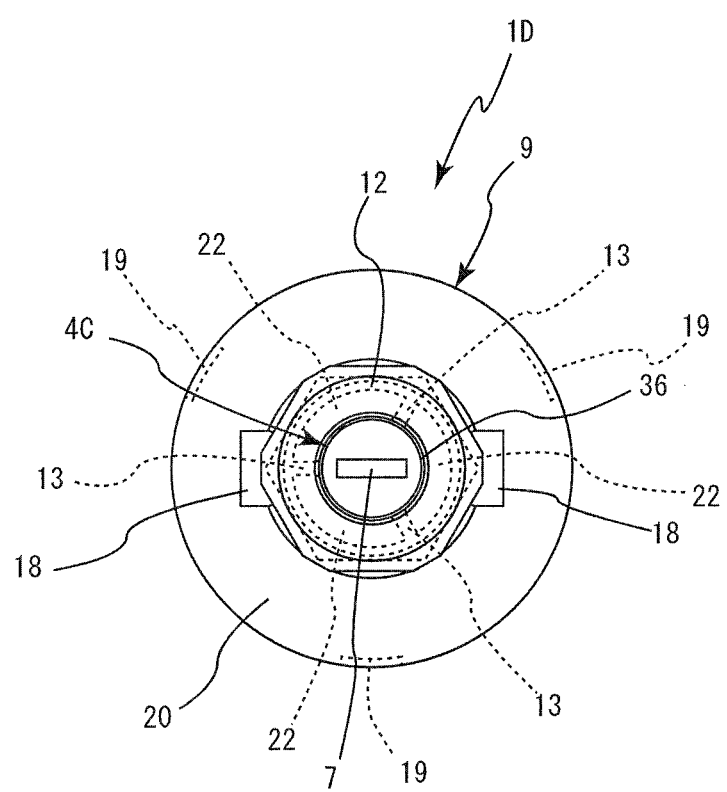
FIG. 27 is a left-side view of the fifth embodiment of the present invention.

A fifth embodiment for carrying out the present invention shown in FIG. 25 to FIG. 27 mainly differs from the first embodiment for carrying out the present invention regarding the following point. According to the fifth embodiment of the present invention, a head section 36 is formed on one end portion or both end portions of a bolt 4C. According to the fifth embodiment of the present invention, the head sections 36 and 36 are formed on both end portions of the bolt 4C. The head sections 36 and 36 allow the easily positioned right screw nut 8 and the easily positioned left screw nut 9 to be thrust thereon, while not allowing typical nuts to be screwed onto the right screw 2 and the left screw 3 of the bolt 4C. A fastening device 1D that is configured using the bolt 4C formed as such can achieve working effects similar to those according to the first embodiment for carrying out the present invention.

Figure 28:
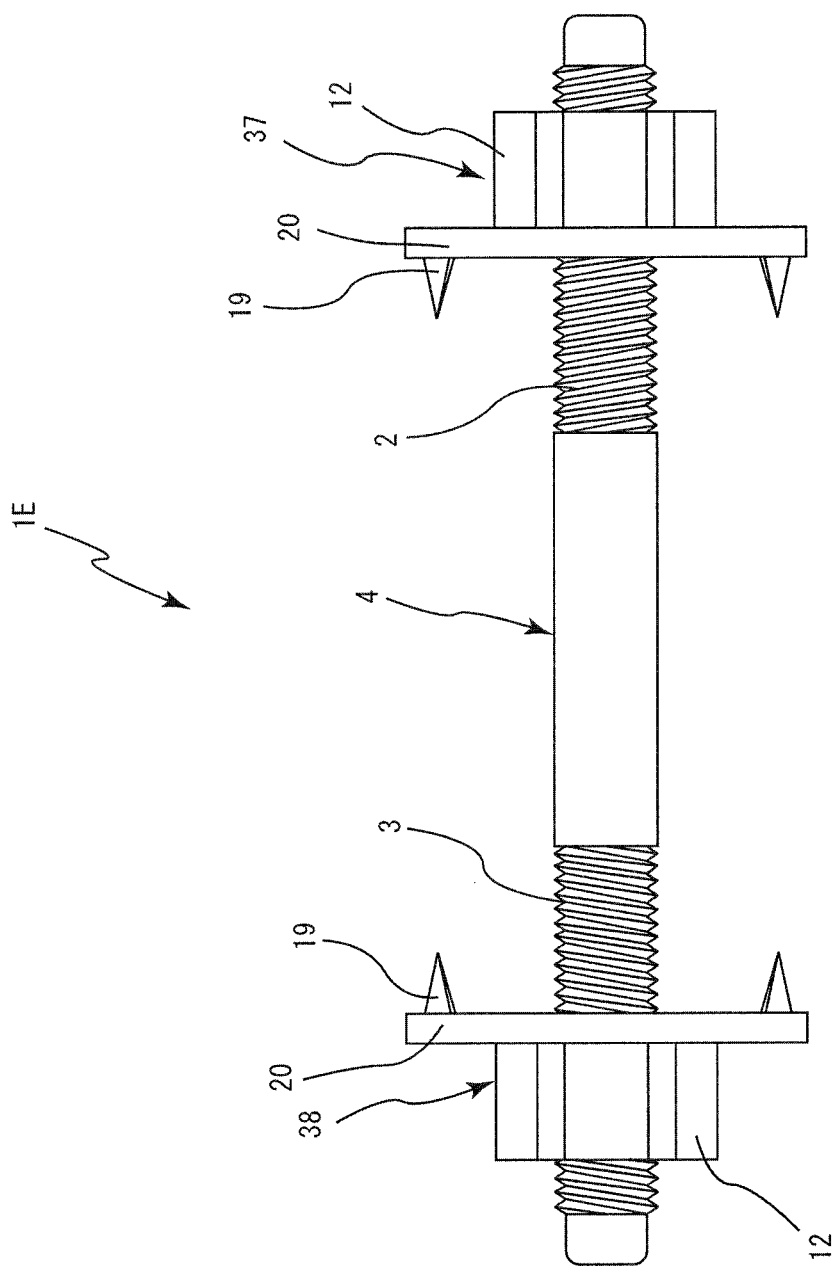
FIG. 28 is a front view of a sixth embodiment of the present invention.
Figure 29:
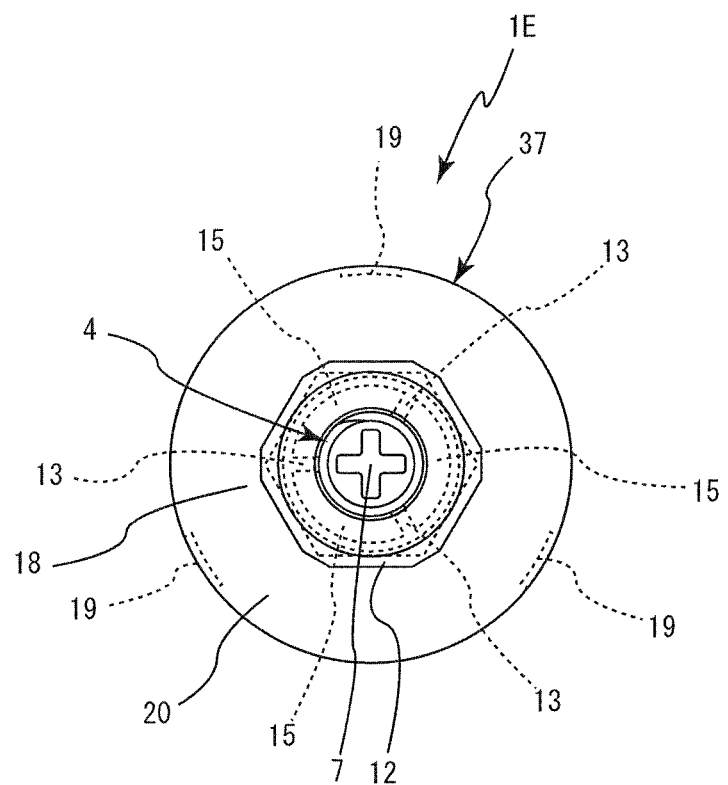
FIG. 29 is a right-side view of the sixth embodiment of the present invention.
Figure 30:
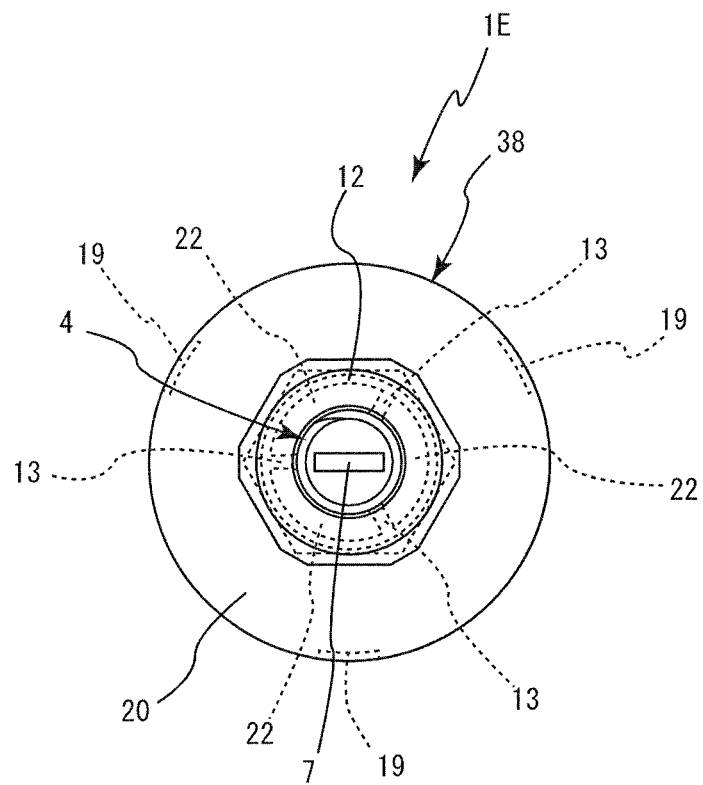
FIG. 30 is a left-side view of the sixth embodiment of the present invention.

A sixth embodiment for carrying out the present invention shown in FIG. 28 to FIG. 30 mainly differs from the first embodiment for carrying out the present invention regarding the following point. According to the sixth embodiment of the present invention, a right screw nut 37 to which the washer 20 is attached and a left screw nut 38 to which the washer 20 is attached are used. A fastening device IF that is configured using such right screw nut 37 to which the washer 20 is attached and left screw nut 38 to which the washer 20 is attached can achieve working effects similar to those according to the first embodiment for carrying out the present invention.

According to the above-described embodiments for carrying out the present invention, wood materials are used as the members to be fastened and fixed together. However, the present invention is not limited thereto. In instances in which the members to be fastened and fixed together are composed or metal alloys or iron, the present invention can be similarly used by use of a spring washer instead of the washer. The spring washer can be composed of any type of material as long as a repulsive function is provided.

In addition, according to the above-described embodiments for carrying out the present invention, a plurality of washers may be attached to the nut main body 12 (12A). Alternatively, the nut may be attached with the plurality of washers therebetween.

Furthermore, the washer may be attached in a fixed manner to the members to be fastened and fixed together by a screw, by welding, or the like.

INDUSTRIAL APPLICABILITY

The present invention is used in an industry for manufacturing fastening devices used to fasten and fix together a column and a beam, a metal piece attached to a column and a beam, wood materials, and the like.

What is claimed is:

1. A fastening device comprising:
a bolt in which a right screw is formed on one end portion and a left screw is formed on another end portion;
a jig engaging section that is formed on one end portion or both end portions of the bolt such as to be capable of being rotated using a jig; and
a right screw nut and a left screw nut that respectively screw onto the right screw in the one end portion of the bolt and the left screw in the other end portion; and
wherein a head section having a greater diameter than a screw thread is formed on either of the one end portion and the other end portion, or both end portions of the bolt, the head section being capable of protecting the screw thread even when struck with a hammer and in which a nut having a smaller diameter than the screw thread or an easily positioned nut is capable of being inserted.

2. A fastening device comprising:
a bolt in which a right screw is formed on one end portion and a left screw is formed on another end portion;
a jig engaging section that is formed on one end portion or both end portions of the bolt such as to be capable of being rotated using a jig; and
a right screw nut and a left screw nut that respectively screw onto the right screw in the one end portion of the bolt and the left screw in the other end portion; and
wherein the right screw nut and the left screw nut are each formed such that positioning is easily performed for screwing the right screw nut onto the right screw and the left screw nut onto the left screw of the bolt, by the right screw nut and the left screw nut moving to predetermined positions in a fastening direction when the right screw and the left screw of the bolt are respectively thrust therein and the bolt being rotated in the fastening direction; and
wherein a washer in which a tab that wedges into a fastening member is formed is attached in a fixed manner or such as to rotate freely to the right screw nut and the left screw nut.

3. The fastening device according to claim 2, wherein at least one of the right screw nut and left screw nut has a circumferential ring groove, and wherein the washer has an engaging piece projecting from a ring portion and configured to engage the circumferential ring groove.

4. The fastening device according to claim 2, wherein at least one of the right screw nut and left screw nut comprise: a nut main body, a screw nut segment, a bias spring, and a guide piece, the nut main body having a bias spring housing chamber receiving the bias spring, the guide piece providing alignment between the nut main body and the screw nut segment.

5. A fastening device comprising:
a bolt in which a right screw is formed on one end portion and a left screw is formed on another end portion;
a jig engaging section that is formed on one end portion or both end portions of the bolt such as to be capable of being rotated using a jig; and
a right screw nut and a left screw nut that respectively screw onto the right screw in the one end portion of the bolt and the left screw in the other end portion; and
wherein the right screw nut and the left screw nut are each formed such that positioning is easily performed for screwing the right screw nut onto the right screw and the left screw nut onto the left screw of the bolt, by the right screw nut and the left screw nut moving to predetermined positions in a fastening direction when the right screw and the left screw of the bolt are respectively thrust therein and the bolt being rotated in the fastening direction; and
wherein a head section having a greater diameter than a screw thread is formed on either of the one end portion and the other end portion, or both end portions of the bolt, the head section being capable of protecting the screw thread even when struck with a hammer and in which a nut having a smaller diameter than the screw thread or an easily positioned nut is capable of being inserted.

* * * * *